H. LANDIS.
METHOD AND MEANS FOR MEASURING ELECTRICAL ENERGY.
APPLICATION FILED APR. 5, 1915.

1,281,399.
Patented Oct. 15, 1918.

FIG. 1$^a$

Witnesses

Inventor.
Heinrich Landis,
By F. Singer,
Attorney

UNITED STATES PATENT OFFICE.

HEINRICH LANDIS, OF ZUG, SWITZERLAND.

METHOD AND MEANS FOR MEASURING ELECTRICAL ENERGY.

1,281,399.   Specification of Letters Patent.   Patented Oct. 15, 1918.

Application filed April 5, 1915.   Serial No. 19,402.

*To all whom it may concern:*

Be it known that I, HEINRICH LANDIS, a citizen of the Swiss Confederation, residing at Zug, Canton Zug, Switzerland, have invented certain new and useful Improvements in Methods and Means for Measuring Electrical Energy, of which the following is a specification.

In alternating current and three-phase circuits having a power-factor of less than unity, it is often desired to make the charge for the current consumed proportional to the power-factor or to the apparent units consumed.

The object of the present invention is to provide a method and measuring devices to suit the above stated requirements even in three-phase circuits having balanced or unbalanced loads.

Present standard watt meters are constructed to register in legal units watts or watthours with substantial independence of power-factor, however the readings of some of the meters must be multiplied by a constant in order to ascertain the energy consumed in legal units, which is very tedious and laborious and apt to be the cause for erroneous findings or results.

According to the present invention two measuring devices are employed, one of which registers the value $$\sqrt{3}\ E.J.\cos\varphi,$$

the other the value $$\sqrt{3}\ E.J.\sin\varphi$$

where E. and J. denote pressure and current respectively and $\varphi$ the angle of lag or of phase displacement. In electricity meters these products are recorded in units of time.

By means of such devices it is possible to measure with the first named device the legal units of the energy consumed and with both devices the apparent energy consumed and the mean angle of lag may be easily calculated from the readings of the two devices or may be read from curve diagrams. If for instance the readings of the two devices are divided in one another the tangents or cotangents of the angle of lag is obtained and therefrom without difficulty the cosine thereof and the angle. The readings so obtained may be used for making out the charge for the consumer. In cases where great transient angles of lag have to be taken in account the two devices may be provided with an apparatus for recording the maximal demand in such a way that not only the mean value may read-off but also the highest value.

In the accompanying drawings the connections and the manner of operation of a measuring device on the principle of Ferraris, which registers the product $$\sqrt{3}\ E.J.\sin\varphi$$

of three-phase circuits with balanced or unbalanced loads is shown.

Fig. 7 illustrates a structural arrangement of coils and armatures in the case of an induction type meter.

Figure 1:
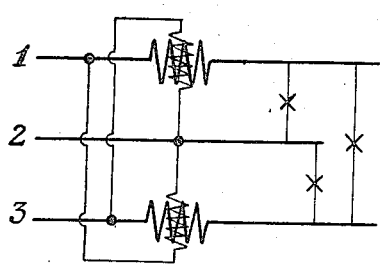
Figure 1 shows diagrammatically two pairs of series and shunt coils for a three-wire phase circuit and the manner of connecting the same.
Figure 2:
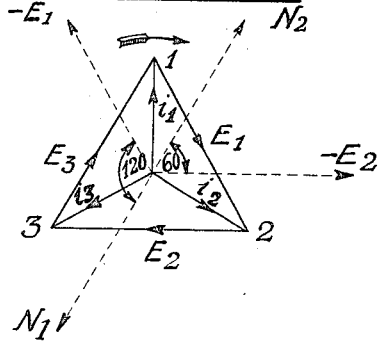
Fig. 2 is a vector diagram showing the relative positions of pressures, current and fields of the apparatus as disclosed in Fig. 1.
Figure 3:
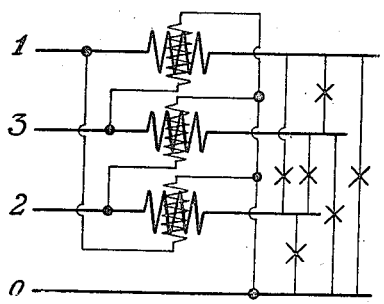
Fig. 3 is a view similar to Fig. 1 with the exception that it shows three pairs of series and shunt coils on a four wire circuit.
Figure 4:
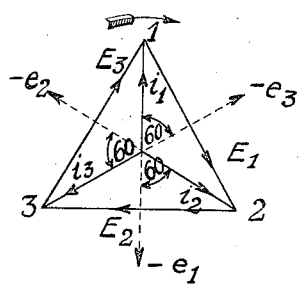
Fig. 4 is vector diagram corresponding to Fig. 2, but applied to an apparatus similar to that disclosed in Fig. 3.

The current of the main current coil connected to the main 1 (Figs. 1, 1ª and 2) coacts with the shunt coil connected to the outer mains 2, 3. The field $N_2$ of the shunt coil which produces the driving torque lags behind the pressure by an angle of 60° and leads in advance of the field of the main current coil by an angle of 30°, if one assumes that the field of the main coil is in phase with the current.

The second measuring system has a main current coil which is connected to the main 3 and a shunt coil connected to the mains 1 and 2. The phase displacement is effected in the well known manner by means of inductive resistances and choking coils which cause the current to lag 120°. The field $N_1$ of this shunt coil lags behind the generating pressure by an angle of 120° and lags behind the field of the main current coil by 30°.

The main current coil in the conductor 1 may be combined with a shunt coil connected to the mains 1 and 2 in which case the torque producing field of the shunt coil has to lag behind the generating pressure by an angle of 120°.

In a similar way a main current coil in the conductor 3 may be combined with a shunt coil connected to the mains 2 and 3, field of which lagging behind the generating current by an angle of 60°.

Besides the methods mentioned other combinations may be made; for instance two main current coils may be made to work with one pressure coil or the shunt coil may be suitably connected with an impedance coil, etc., producing a certain angle of lag.

The essential feature of the invention consists in that a field of a main current coil is combined with a field of a shunt coil which is in advance of the former by an angle of lag of 30° if the circuit is non-inductive; while the field of a second main current coil works together with a field of a shunt coil lagging behind the main current field by an angle of 30° under the same conditions.

The present invention is not limited to any special means for creating the phase difference between the main and the shunt fluxes; either the current or the shunt fields or both may be shifted to obtain the measuring angle of phase displacement between the field creating the torque.

A device constructed as described measures the value $$\sqrt{3}\ E.J.\ \sin \varphi$$

quite correct whether the mains are equally loaded or not.

This fact is comprehensible as it is known that the product $J \sin \varphi$ equals the wattless component of the current. While the readings of an effect-measuring instrument are proportional to the product of pressure and the watt-component of the current $J \cos \varphi$; an instrument of the class mentioned above gives readings which are proportional to the product of pressure and the wattless component of the current $J \sin \varphi$. As the three pressures of a three-phase net may be assumed as being equal to each other it matters little which pressure is used for generating the magnetic fields producing the torque, as long as the necessary phase difference between the shunt and main current fluxes are obtained.

In Figs. 3 to 6 connections and diagrams are shown for measuring the same value correctly by means of three measuring instruments especially three-phase for measuring the power absorbed in systems with four conductors. For this purpose I arrange in each of three outer mains of the three-phase net 1, 2, 3 a main current coil. Each of these main current coils acts in combination with a pressure coil the field of which is in phase with the field of the main current coil with non-inductive loads if the measuring device is constructed on the principle of Ferraris. If the instrument is build on the dynamometric principle the torque producing field of the pressure coil has to have a phase displacement of 90° against the field of the main current coil. The torque, the beat or the angular velocity of each of the said measuring instruments is proportional to the product of the current in the respective conductor, the pressure and the sine of the angle of phase displacement between the two. The sum of the readings of the three measuring instruments which may be read-off at different or on a common recording device is proportional to the product I. E. sin $\varphi$; $e$ denoting the pressure of the outer mains of the three phase system with respect to each other and $i$ the current flowing therein. I make by this the admissible assumption that the pressures between the three outer mains and the neutral conductor are equal to each other. In dynamometrical measuring instruments it is difficult to obtain an angle of phase difference of 90° between the fields which excite the torque and it is equally difficult to obtain a phase difference of 0° between the said fields of Ferraris instruments. To obviate these difficulties I do not combine the current of the outer main and the pressure of the same against the neutral conductor as is usual with the known electricity meters. I combine as shown for example in Fig. 3 the main current coil of the main 1 with a pressure coil connected to the main 3; the main current coil of the main 2 with a pressure coil connected to the conductor 1 and the main current coil of the main 3 with a pressure coil connected to conductor 2. The other ends of the pressure coils are connected with each other and with a neutral conductor, if there is one present.

If one assumes as correct (what may be safely made) that the fields of the main current coils are in phase with the current then the fields of the pressure coil (connected to the negative pressure $e_3$) has to have a phase difference of 60° lagging behind the exciting pressure by that angle. The pressure coils connected to the negative pressures $e_2$ and $e_1$ have to have the same phase displacement. The field of these pressure coils which give the driving torque coincide with the fields of the main current coils.

Figure 5:
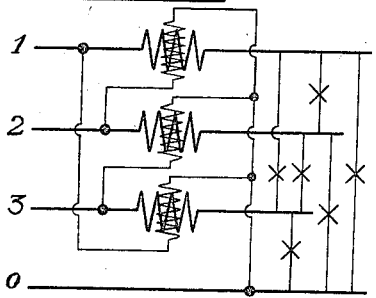
Figs. 5 and 6 show respectively a modified arrangement and the vector diagram of the same.
Figure 6:
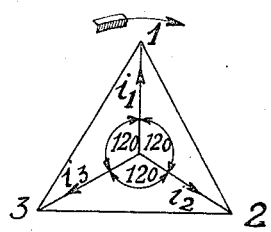
Figure 6:
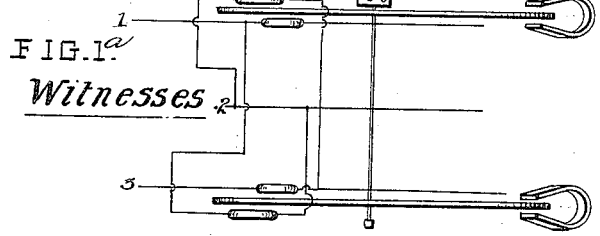

Fig. 5 shows another connection of the pressure coils. A main current coil connected to the main 1 co-acts with a pressure coil connected to the conductor 2; a main current coil in main 2 co-acts with a pressure coil connected to the conductor 3 and the main current coil arranged in the main 3 co-acts with a pressure coil connected to the main 1. The second ends of the three pressure coils are connected with the neutral conductor. To obtain a phase difference of 0° between the torque producing fields in systems with non-inductive loads the torque producing fields of the pressure coils have to lag by an angle of 120° behind the producing pressure as shown in Fig. 6. It is to be understood that pressure coils lagging by an angle of 60° may be used together with pressure coils lagging by an angle of 120° if the coils are connected to the proper mains.

In dynamometric measuring devices in which the field of the pressure coil may be kept in phase with the pressure itself a pressure coil connected to the mains 2 and 3 is advantageously combined with a main current coil in the main 1. The field of this pressure coil has a phase displacement of 90° with regard to the main current coil. These pressures may be used in connection with measuring instruments on Ferraris principle of an angle of 90° between the pressure and the field of the pressure coil is obtainable.

I wish it clearly understood that various changes in the connections may be made without departing from the spirit of my invention.

What I claim is:

An instrument of the character described for three phase current systems with balanced and unbalanced loads, comprising in combination, two measuring systems for measuring the wattless component of the apparent power including means for producing a main field and a shunt field, said coöperating shunt field being in advance of said main field by an angle of 30° with a non-inductive load, and means for producing a second main field and a second coöperating shunt field lagging by an angle of 30° under the same conditions.

In testimony whereof, I affix my signature in the presence of two witnesses.

HEINRICH LANDIS.

Witnesses:
  Fritz Irle,
  M. C. Pierce.

Copies of this patent may be obtained for five cents each, by addressing the "Commissioner of Patents, Washington, D. C."